United States Patent
Berthomieu et al.

(10) Patent No.: US 7,100,997 B2
(45) Date of Patent: *Sep. 5, 2006

(54) SERVO BRAKE SYSTEM COMPRISING A DECOMPRESSION PISTON INTEGRATED WITH THE PUSHROD

(75) Inventors: Bruno Berthomieu, Barcelona (ES); Juan Simon Bacardit, Barcelona (ES); Fernando Sacristan, Cabrils (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/542,097

(22) PCT Filed: Jan. 26, 2004

(86) PCT No.: PCT/EP2004/000619

§ 371 (c)(1),
(2), (4) Date: Jul. 13, 2005

(87) PCT Pub. No.: WO2004/067345

PCT Pub. Date: Aug. 12, 2004

(65) Prior Publication Data

US 2006/0055236 A1    Mar. 16, 2006

(30) Foreign Application Priority Data

Jan. 27, 2003   (FR)   ................... 03 00884

(51) Int. Cl.
*B60T 8/44* (2006.01)

(52) U.S. Cl. .................................. 303/114.3; 91/369.2
(58) Field of Classification Search ............. 303/114.3; 60/553, 533; 91/369.1, 369.2
See application file for complete search history.

(56) References Cited

U.S. PATENT DOCUMENTS

| | | | | |
|---|---|---|---|---|
| 6,082,109 A | * | 7/2000 | Simon Bacardit | 60/553 |
| 6,092,453 A | * | 7/2000 | Preker | 91/369.1 |
| 6,318,081 B1 | * | 11/2001 | Bacardit | 60/533 |
| 6,931,979 B1 | * | 8/2005 | Bacardit et al. | 91/369.2 |
| 2003/0056642 A1 | * | 3/2003 | Kobayashi | 91/369.2 |
| 2006/0038440 A1 | * | 2/2006 | Berthomieu et al. | 303/114.3 |

FOREIGN PATENT DOCUMENTS

| | | |
|---|---|---|
| DE | 19917281 | 10/2000 |
| DE | 10113292 | 9/2002 |
| FR | 2820388 | 8/2002 |

* cited by examiner

*Primary Examiner*—Chris Schwartz
(74) *Attorney, Agent, or Firm*—Leo H. McCormick, Jr.; Sarah Taylor

(57) ABSTRACT

A boosted brake (10) having a booster (12) for activating a primary piston (54) of a master cylinder (14) by way of a feeler (42), a reaction disk (28) and a push rod (52). The push rod (52) that is housed a decompression piston (62) and returned elastically by a spring (70) to a position of rest has at least two radial branches (64) in order to provide two boost ratios which differ according to the intensity of the input force.

12 Claims, 6 Drawing Sheets

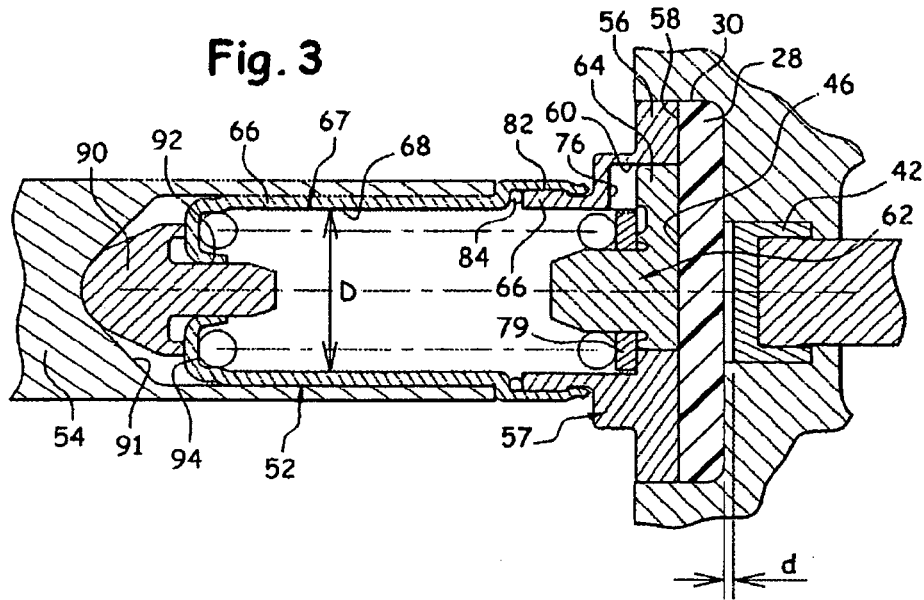
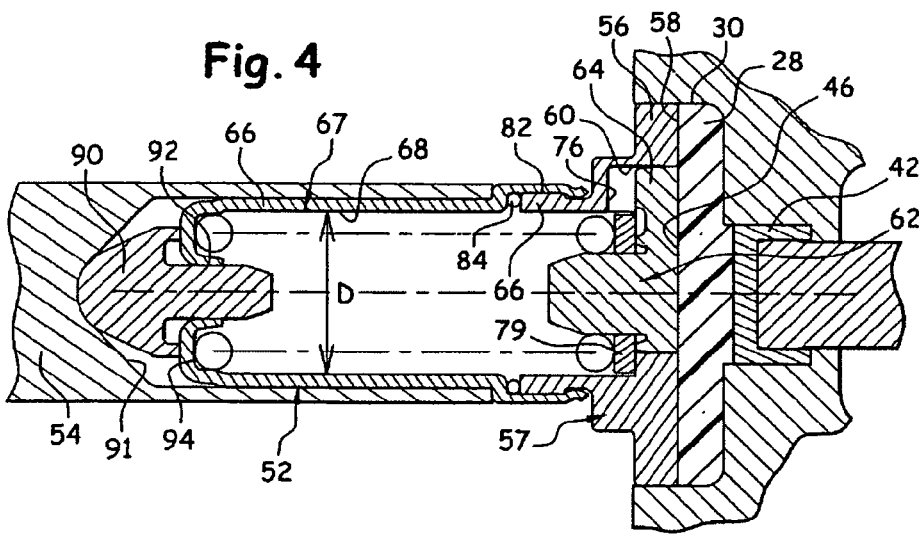

SERVO BRAKE SYSTEM COMPRISING A DECOMPRESSION PISTON INTEGRATED WITH THE PUSHROD

The invention disclosed in this application relates to the general subject matter of brake boosters and in particular the brake booster disclosed in co-pending U.S. patent application Ser. No. 10/542,096 filed on Jul. 13, 2005.

The invention relates to a boosted brake for a motor vehicle.

BACKGROUND OF THE INVENTION

The invention relates more particularly to a boosted brake for a motor vehicle, of the type which comprises a pneumatic brake booster actuating a master cylinder, of the type in which the booster comprises a rigid casing inside which can move a transverse partition sealably delimiting a front chamber subjected to a first pressure and a rear chamber subjected to a second pressure varying between the first pressure and a pressure greater than the first pressure, of the type in which the booster comprises a moving piston fixed to the moving partition and comprising a front face which can act on a primary piston of the master cylinder by way of a reaction disk housed in a cage interposed between the moving piston and the primary piston, of the type in which the booster comprises a control rod which moves in the piston selectively as a function of an axial input force exerted forward against a return force exerted on the rod by a return spring, of the type in which the booster comprises a plunger which is arranged in front of the control rod in the piston and which comprises at its rear end at least one annular rear seat of a three-way valve which can move progressively between a position in which, with the control rod at rest, the front chamber and the rear chamber are in communication, and a position in which, with the control rod actuated, the second pressure prevailing in the rear chamber increases, the valve placing the rear chamber in communication with the pressure which is greater than the first pressure, and of the type in which the booster comprises a feeler, arranged at the front end of the plunger and passing through a bore leading from the piston, which, when the control rod is in the rest position, is arranged at a defined jump distance from the reaction disk and which is able, when the control rod is actuated with an input force whose intensity is greater than a first defined intensity, to come into contact with the reaction disk in such a way as to transmit to the plunger and to the control rod the reaction force of the master cylinder, the ratio of the area of the reaction disk in contact with the cage to the area of the feeler in contact with the reaction disk defining a first defined boost ratio, and of the type in which the cage comprises at least one moving decompression wall which, when the control rod is actuated with an input force whose intensity is greater than a second defined intensity greater than the first, is able to move so as to create in the cage an additional volume in which a front part of the reaction disk is able to expand in order to reduce the reaction force transmitted to the feeler by way of the rear face of the reaction disk, the ratio of the area of the reaction disk in contact with the cage to the area of the feeler in contact with the reaction disk defining a second boost ratio, which is greater than the first.

Many examples of boosted brakes of this type are known.

In such a boosted brake, the moving decompression wall generally forms part of a device which is attached to the cage and which is interposed between the reaction disk and the primary piston of the master cylinder.

This device conventionally consists of a housing having one face attached to the reaction disk, this face being drilled to allow the passage of a cylindrical decompression piston which, for its part, is also arranged in contact with the reaction disk substantially within the axis of the feeler. The decompression piston is returned elastically toward the reaction disk by a helical spring which is housed inside the housing and which has substantially the same diameter as the decompression piston. When the intensity of the input force exceeds the second defined value, the decompression piston is pushed back in the housing, compressing the helical spring, and it thus creates a free volume which allows the reaction disk to be decompressed.

SUMMARY OF THE INVENTION

This design has many disadvantages in terms of space requirement.

Specifically, this design entails the use of a helical spring which has substantially the same diameter as the decompression piston. It is therefore impossible to reduce the diameter of the helical spring without reducing the diameter of the decompression piston which, as a result, would no longer have an appropriate surface area for creating in the cage a decompression volume sufficient to bring about suitable decompression of the reaction disk.

Conversely, the use of a decompression piston of suitable size does not make it possible to use a helical spring of sufficiently small diameter for the housing to be able, for example, to be housed in a push rod interposed between the cage and the primary piston of the master cylinder.

To overcome this disadvantage, the invention provides a boosted brake comprising a decompression piston of large surface area which is able to create a suitable decompression volume for the reaction disk and nevertheless allows the use of a helical spring of small size.

To this end, the invention provides a boosted brake of the above-described type, characterized in that it comprises an independent push rod, which is interposed between the reaction disk and the primary piston of the master cylinder, and which comprises:
  a rear section having a rear face arranged in contact with the reaction disk and in which an opening leading into the rear face accommodates a matching decompression piston, of a defined transverse size, which comprises at least two radial branches and a rear face of which forms the moving decompression wall,
  a tubular front section, of which a bore, which leads out at the front end of the opening and has a diameter smaller than the defined transverse size, accommodates a helical spring accommodating a return rod of the decompression piston, in order to provide a decompression piston of maximum transverse size and a push rod of minimum diameter.

According to other features of the invention:
  at the junction of the front section and of the rear section:
    the rear section comprises at least one face which forms an axial stop for the return spring of the decompression piston, which face is arranged angularly between two successive branches of the decompression piston and which projects transversely inside the bore,
    the front section comprises at least one face which forms an axial stop for the decompression piston, which face is arranged in the axial continuation of at least one of the two branches of the decompression piston and which projects inside the opening, the front end of each branch of the decompression piston comprises at least one bearing face for the helical spring, which bearing face is arranged according to the diameter of the tubular front section, the front end of each branch of the decompression piston comprises at least one axial stop face intended to interact with the axial stop face of the front section, the return rod of the decompression piston has a diameter corresponding substantially to the inside diameter of the helical spring, the push rod comprises a bearing washer which is fitted between the helical spring and the bearing face of the decompression piston and has an outside diameter corresponding to that of the bore of the front section and has an inside diameter corresponding to that of the return rod of the decompression piston, the push rod comprises:

a tubular front part which comprises one part of the front section, a rear part which internally comprises the other part of the front section and the rear section, the front part is tightly fitted in the front-end bore of the rear part, the front part is crimped on a cylindrical front-end bearing surface of the rear part in a variable axial position allowing the preload of the helical spring to be adjusted, the tubular front part comprises, at its front end, an axial finger intended to allow the push rod to press on the primary piston of the master cylinder, the decompression piston comprises three branches distributed angularly in a regular manner, the decompression piston comprises two opposed branches which extend radially as far as the periphery of the rear face of the rear section.

Other features and advantages of the invention will become apparent on reading the detailed description which follows and which will be understood by referring to the appended drawing.

BRIEF DESCRIPTION OF THE DRAWINGS

FIG. 3 is a detail view of a booster forming part of a boosted brake according to the invention and comprising a first embodiment of a push rod, represented in a position in which the control rod is actuated with a force whose intensity is smaller than the first defined intensity;

FIG. 4 is a detail view of the booster of FIG. 3 represented in a position in which the control rod is actuated with a force whose intensity is greater than the first defined intensity and smaller than the second defined intensity;

In the description which will follow, identical reference numbers denote components which are identical or have similar functions.

DETAILED DESCRIPTION OF THE INVENTION

By convention, the terms "front" "rear" "upper" and "lower" respectively denote elements or positions which are respectively directed toward the left, the right, the top or the bottom of the figures.

Figure 1:
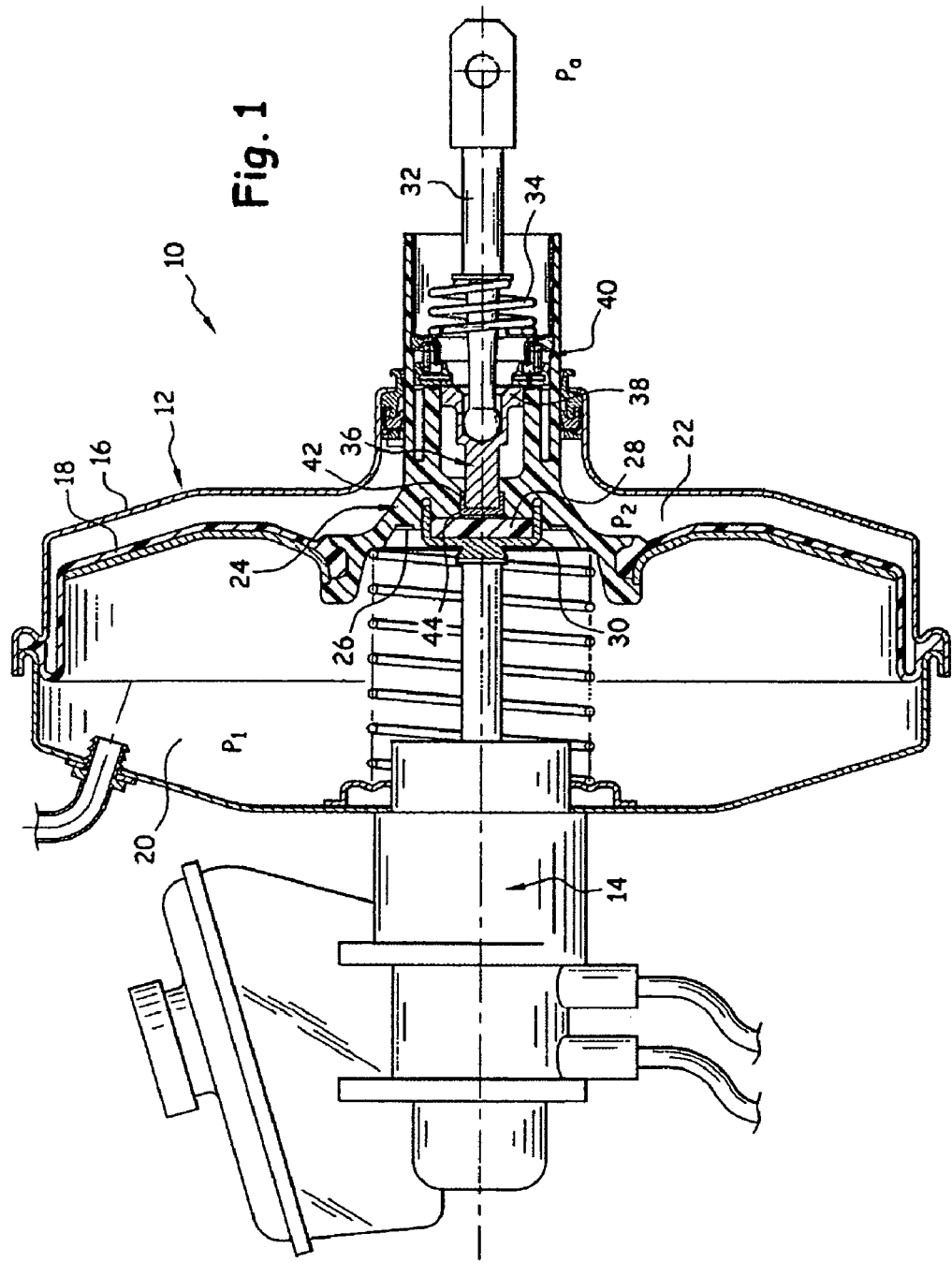
FIG. 1 is a view in axial section of a boosted brake according to a prior state of the art.

FIG. 1 shows the complete boosted brake 10 for a motor vehicle.

In a known way, the boosted brake 10 comprises a pneumatic brake booster 12 which is intended to activate a master cylinder 14.

The booster 12 comprises a rigid casing 16 inside which can move a transverse partition 18 sealably delimiting a front chamber 20 subjected to a first pressure "$P_1$" and a rear chamber 22 subjected to a second pressure "$P_2$" varying between the first pressure "$P_1$" and a pressure "$P_a$" which is greater than the first pressure "$P_1$".

In a known way, the booster 12 comprises a moving piston 24 fixed to the moving partition 18 and comprising a front face 26 which is able to act on a primary piston of the master cylinder 14 by way of a reaction disk 28. The reaction disk 28 is housed in a cage 30 which is interposed between the moving piston 24 and the primary piston (not shown).

The booster 12 also comprises a control rod 32 which moves in the piston 24 selectively as a function of an axial input force exerted toward the front against a return force exerted on the rod 32 by a return spring 34.

The booster 12 comprises a plunger 36 which is arranged in front of the control rod 32 in the piston 24 and which comprises at its rear end 38 at least one annular rear seat of a three-way valve 40 which can move progressively between a position in which, with the control rod 32 at rest, the front chamber 20 and the rear chamber 22 are in communication, and a position in which, with the control rod 32 actuated, the second pressure "$P_2$" prevailing in the rear chamber 22 increases, the valve 40 placing the rear chamber 22 in communication with the pressure "$P_a$" which is greater than the first pressure.

The booster 12 comprises a feeler 42, arranged at the front end of the plunger 36 and passing through a bore 44 leading from the piston 24, which, when the control rod 32 is in the rest position, is arranged at a defined jump distance from the reaction disk 28 and which is able, when the control rod 32 is actuated with an input force whose intensity is greater than a first defined intensity, to cross over the jump distance and come into contact with the reaction disk 28 in such a way as to transmit the reaction force of the master cylinder 14 to the plunger 36 and to the control rod 32.

In this configuration, the ratio of the area of the reaction disk 28 in contact with the cage 30 to the area of the feeler 42 in contact with the reaction disk 28 in a known way defines a first defined boost ratio.

The disadvantage of this known design is that when the control rod is actuated rapidly with an input force whose intensity is greater than the first defined intensity, the delay in the balancing of the pressures between the front chamber 20 and rear chamber 22 does not allow the moving piston 24 to sufficiently boost the driver's braking force, which must, moreover, overcome the reaction force that the master cylinder 14 exerts on the rod 32 by way of the reaction disk 28.

To overcome this disadvantage, a boosted brake 10 (not shown) of the type described above has been provided in which the cage 30 comprises at least one moving decompression wall which, when the control rod 32 is actuated with an input force whose intensity is greater than a second defined intensity greater than the first, is able to move so as to create in the cage 30 an additional volume in which a front part of the reaction disk 28 is able to expand with respect to the feeler 42.

In this way, a rear part of the reaction disk 28 is able to decompress locally at the level of the feeler 42, which makes it possible to reduce the reaction force transmitted to the feeler 42 by way of the rear face of the reaction disk.

Moreover, in this configuration, since the area of the feeler 42 in contact with the reaction disk is small, the defined boost ratio increases. This second boost ratio is therefore greater than the first.

In such a boosted brake, the moving decompression wall generally forms part of a decompression device which is attached to the cage and which is interposed between the reaction disk and the primary piston of the master cylinder.

This boosted brake (not shown) conventionally comprises a housing fixed to the primary piston of the master cylinder, one face of which housing is attached to the reaction disk and is drilled to allow the passage of a cylindrical decompression piston which, for its part, is also arranged in contact with the reaction disk. The decompression piston is returned elastically toward the reaction disk by a helical spring which is housed inside the housing and which has substantially the same diameter as the decompression piston. When the intensity of the input force exceeds the second defined value, the decompression piston is pushed back in the housing, compressing the helical spring, and it thus creates a free volume which allows the reaction disk to be decompressed.

This design has many disadvantages in terms of space requirement.

Specifically, this design entails the use of a helical spring which has substantially the same diameter as the decompression piston. It is therefore impossible to reduce the diameter of the helical spring without reducing the diameter of the decompression piston which, as a result, would no longer have an appropriate surface area for creating in the cage a decompression volume sufficient to bring about suitable decompression of the reaction disk.

Conversely, the use of a decompression piston of suitable size does not make it possible to use a helical spring of sufficiently small diameter for the housing to be able, for example, to be integrated in a push rod interposed between the cage and the primary piston of the master cylinder.

Figure 2:
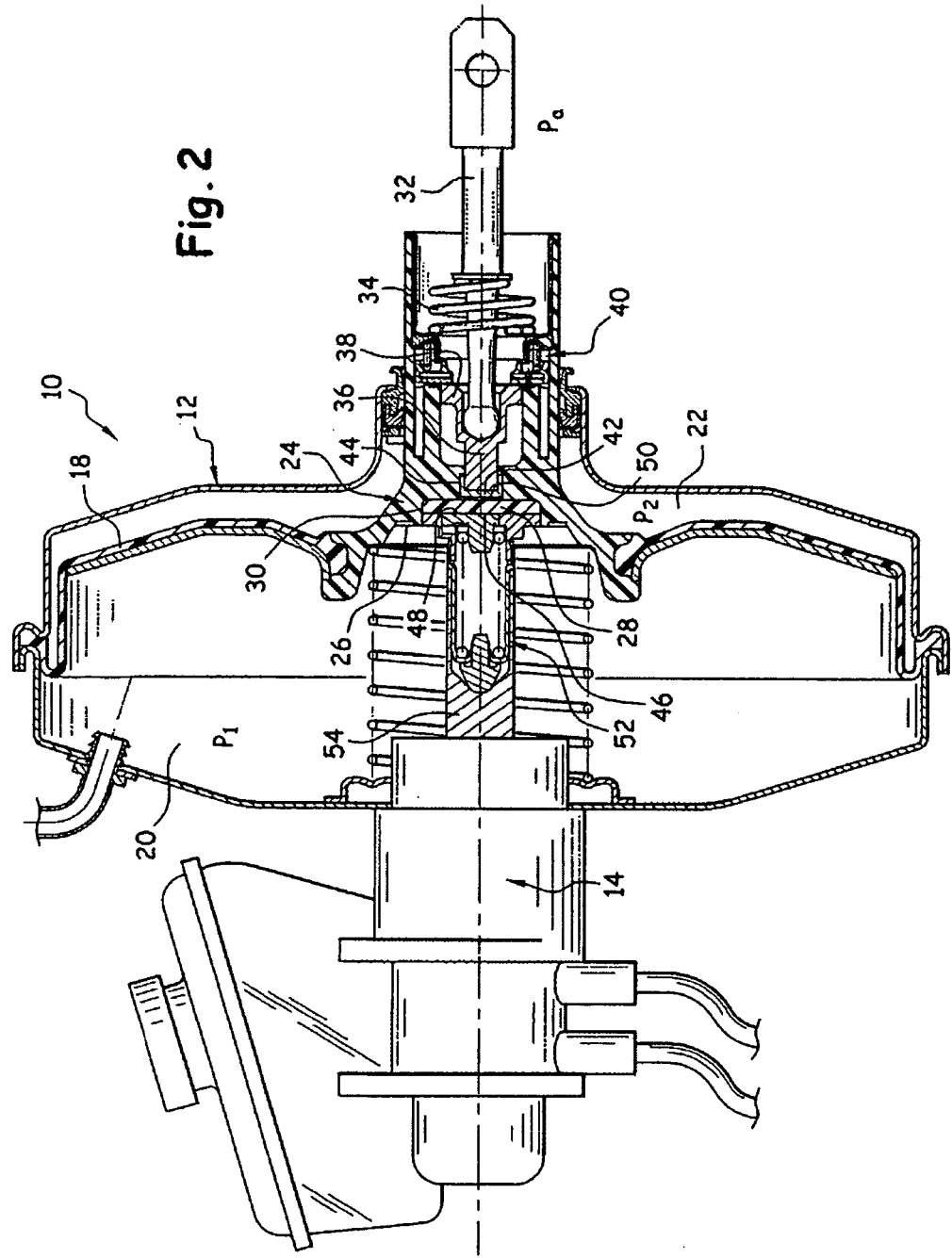
FIG. 2 is a view in axial section of a boosted brake produced according to the invention.

To overcome this disadvantage, as illustrated in FIG. 2 and the subsequent figures, the invention provides a boosted brake 10 of the above-described type comprising a compact decompression device.

In a known way, the boosted brake 10 is provided with a cage 30, formed in the piston 24, at least one moving decompression wall 46 of which cage is able, when the control rod 32 is actuated with an input force whose intensity is greater than a second defined intensity greater than the first, to move so as to create in the cage 30 an additional volume in which a front part 48 of the reaction disk 28 is able to expand in order to reduce the reaction force transmitted to the feeler 42 by way of the rear face 50 of the reaction disk 28.

More particularly, according to the invention and as illustrated in FIG. 2 and the subsequent figures, the booster 12 comprises an independent push rod 52, which is interposed between the reaction disk 28 and the primary piston 54 of the master cylinder 14, and which comprises a rear section 56 having a rear face 58 intended to be arranged in contact with the reaction disk 28 and in which an opening 60 leading into the rear face 58 accommodates a matching decompression piston 62, of a defined transverse size "E", which comprises at least two radial branches 64 and a rear face of which forms the moving decompression wall 46.

Figure 7A:
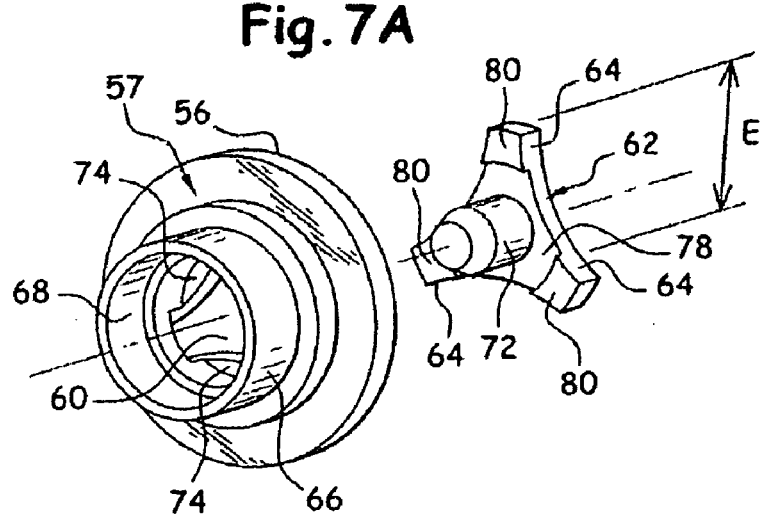
FIG. 7A is an exploded perspective view of the front of the rear part of the push rod of FIGS. 3 to 5.
Figure 7B:
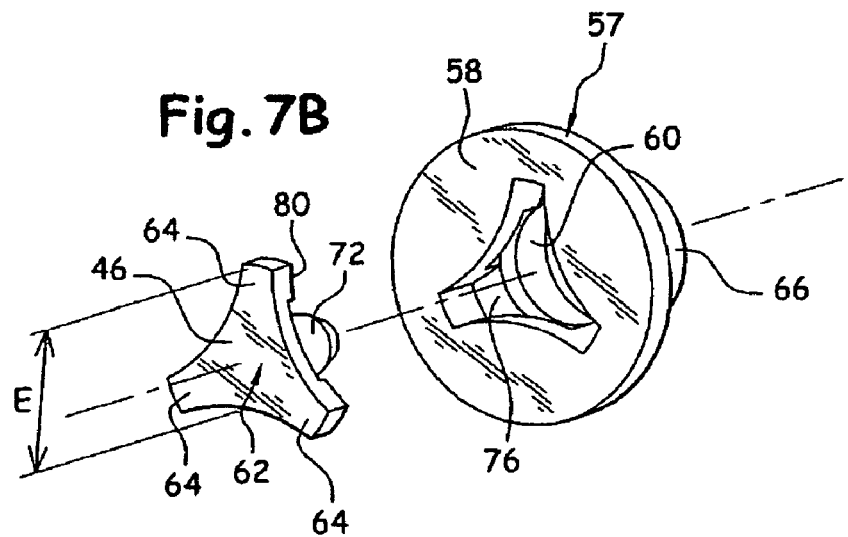
FIG. 7B is an exploded perspective view of the rear of the rear part of the push rod of FIGS. 3 to 5.
Figure 9A:
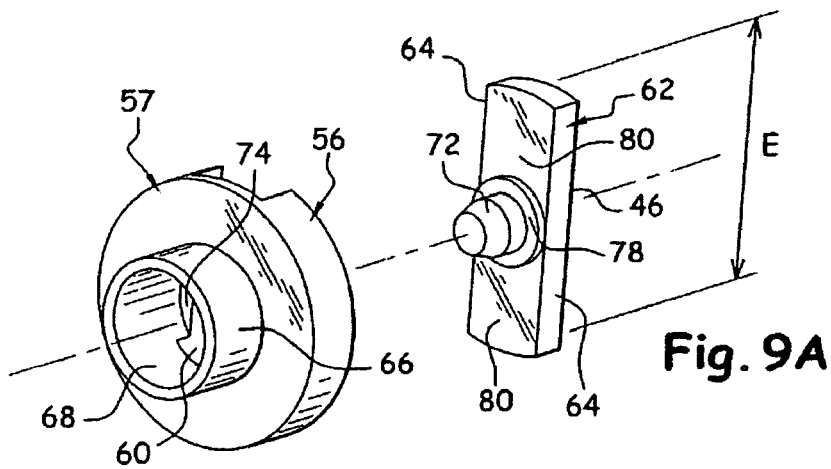
FIG. 9A is an exploded perspective view of the front of the rear part of the push rod of FIG. 8.
Figure 9B:
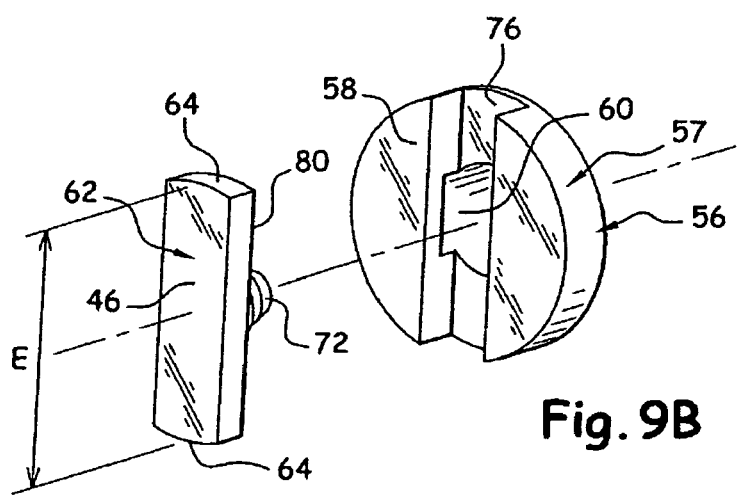
FIG. 9B is an exploded perspective view of the rear of the rear part of the push rod of FIG. 8.

FIGS. 7A and 7B represent a first embodiment of a piston 62 comprising three radial branches 64 distributed angularly in a regular manner, and FIGS. 9A and 9B represent a second embodiment of the invention comprising two radial branches 64 which extend radially as far as the periphery of the rear face 58 of the rear section 56.

It will be understood that these arrangements in no way restrict the invention and that the piston 62 could comprise a greater number of branches 64, for example 4, 5 or 6 radial branches 64.

The independent push rod 52 also comprises a tubular front section 66, of which a bore 68, which leads out at the front end of the opening 60 and has a diameter "D" smaller than the defined transverse size "E" accommodates a helical spring 70 accommodating a return rod 72 of the decompression piston 62. Preferably, the return rod 72 of the decompression piston has a diameter corresponding substantially to the inside diameter of the helical spring 70.

In this way, the boosted brake 10 provides a decompression piston 62 of maximum transverse size "E" and a push rod 52 of minimum diameter, substantially close to the diameter "D" of its bore 68.

It will be understood that the front section 66 and rear section 56 are associated with the bore 68 and the opening 60, respectively, and that they are not necessarily independent. Thus, in the preferred embodiments of the invention, the push rod 52 comprises a tubular front part 67 which comprises one part of the front section 66 and a rear part 57 which internally comprises the other part of the front section 66, and therefore the other part of the bore 68, and the rear section 56.

More specifically, as illustrated in FIGS. 7A and 9A, at the junction of the front section 66 and of the rear section 56, the rear section 56 comprises at least one face 74 which forms an axial stop for the return spring 70 of the decompression piston 62.

Figure 8:
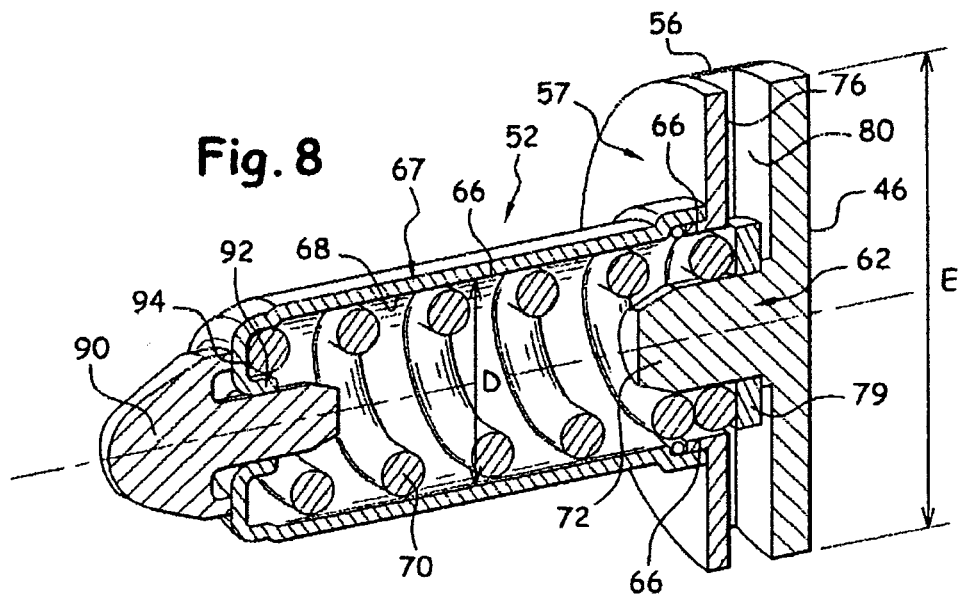
FIG. 8 is an assembled perspective view of a second embodiment of the push rod of the booster.

The face 74, arranged at the end of the opening 60, is arranged angularly between two successive branches 64 of the decompression piston 62 and it projects transversely inside the bore 68. Thus, the rear part 57 associated with the piston 62 having three branches 64 as shown in FIGS. 3 to 7B comprises three faces 74 which are distributed between the three branches of the opening 60 corresponding to the three branches 64 of the piston 62, while the rear part 57 associated with the piston 62 having two branches 64 as shown in FIGS. 8 to 9B comprises two faces 74 distributed between the two branches of the opening 60 corresponding to the two branches 64 of the piston 62.

Moreover, as illustrated in FIGS. 3 to 6, 7B, 8 and 9B, the front section 66 comprises, in the rear part 57, at least one face 76 which forms an axial stop for the decompression piston 62. The face 76 is arranged in the axial continuation of at least one of the two branches 64 of the decompression piston 62 and it projects inside the opening 60. Each rear part 57 therefore comprises as many stop faces 76 as the piston 62 comprises branches 64.

As illustrated in FIGS. 7A and 9A, to allow the piston 62 to return while retaining a piston 62 which has simple shapes and is axially compact, the front end of each branch 64 of the decompression piston 62 comprises at least one bearing face 78 for the helical spring 70, which bearing face is arranged according to the diameter of the tubular front section 66.

In the configurations described with reference to the first and second embodiments of the invention, the faces 78 are distributed over all the branches 64 of the piston 62. The piston 62 of FIG. 7A thus comprises three faces 78 and the piston 62 of FIG. 9A comprises a face 78 shaped in the form of an annular shoulder face.

The spring 70 may bear directly on the face 78, but the push rod 52 preferably comprises a bearing washer 79 which is fitted between the helical spring 70 and the bearing face 78 of the decompression piston 62. This washer 79 has an outside diameter corresponding to that of the bore 68 of the front section and it has an inside diameter corresponding to that of the return rod 72 of the decompression piston 62.

Thus, when the piston 62 occupies its rear position as shown in FIGS. 3, 4, 6 and 8, the spring 70 bears in the same plane on the face 78 of the piston and the face 74 of the rear section 56, which makes it possible to benefit from a particularly axially compact rear part 57.

Figure 5:
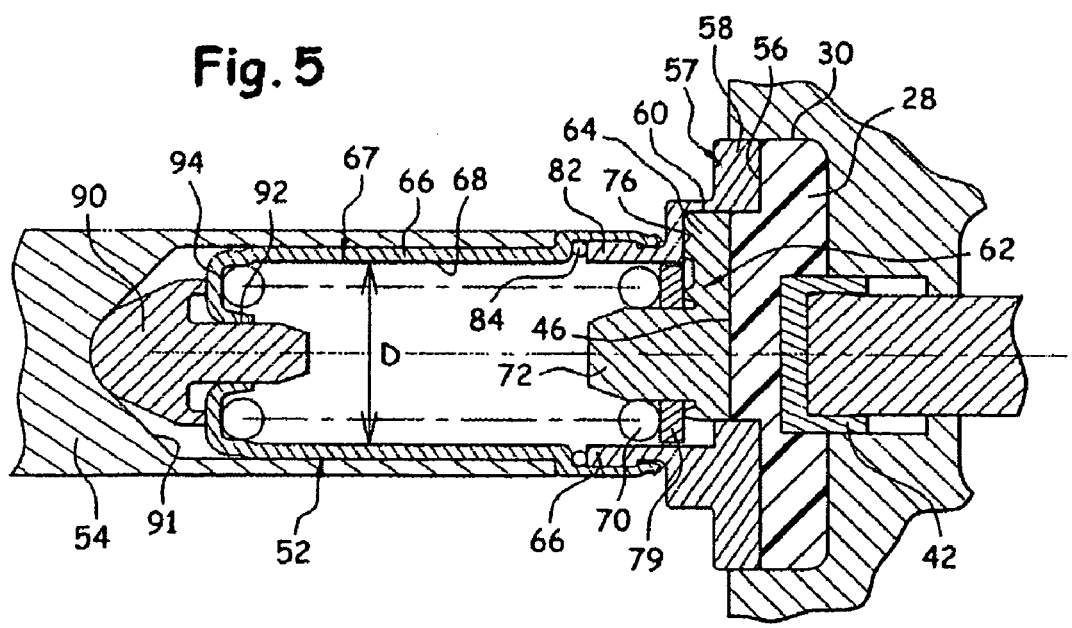
FIG. 5 is a detail view of the booster of FIG. 3 represented in a position in which the control rod is actuated with a force whose intensity is greater than the second defined intensity.

In this way, the moving wall 46 can move as represented in FIGS. 3 to 5.

In an initial position represented in FIG. 3, a zero input force, or a force whose intensity is smaller than a first defined intensity, is applied to the control rod 32. In this configuration, the feeler 42 does not act on the reaction disk 28 and it is arranged at a jump distance "d" from the latter.

In an intermediate position represented in FIG. 4, an input force is applied to the control rod 32 with an input force whose intensity is greater than the first defined intensity and smaller than a second defined intensity. In this configuration, the reaction disk 28 is deformed and substantially closes up the jump distance "d" separating it from the feeler 42 in order to transmit the input force to the primary piston 54 according to the first defined boost ratio. In this configuration, since the input force is smaller than the preload of the spring 70, the decompression piston 62 is not acted upon and remains in alignment with the rear face 58 of the section 56. The reaction disk 28 transmits the whole of the reaction of the master cylinder 14 to the feeler 42.

In the decompression position represented in FIG. 5, an input force is applied to the control rod 32 with an input force whose intensity is greater than the second defined intensity. In this configuration, the feeler 42 acts on the reaction disk 28, which overcomes the antagonistic force of the spring 70, and the decompression piston 62 pushes into the opening 60, locally decompressing the reaction disk 28 in contact with the feeler 42. The input force is transmitted to the primary piston 54 according to the second defined boost ratio, which is greater than the first. The reaction disk 28 no longer transmits more than a fraction of the reaction of the master cylinder 14 to the feeler 42.

Advantageously, the front end of each branch 64 of the decompression piston also comprises at least one axial stop face 80 intended to interact with the axial stop face 76 of the front section 66.

In the first and second embodiments represented in FIGS. 3 to 5 and 8, the front part 67 is crimped on a cylindrical front-end bearing surface 82 of the rear part 57 in a variable axial position allowing the preload of the helical spring 70 to be adjusted. For example, a key 84 may be interposed between the parts 67 and 57.

Figure 6:
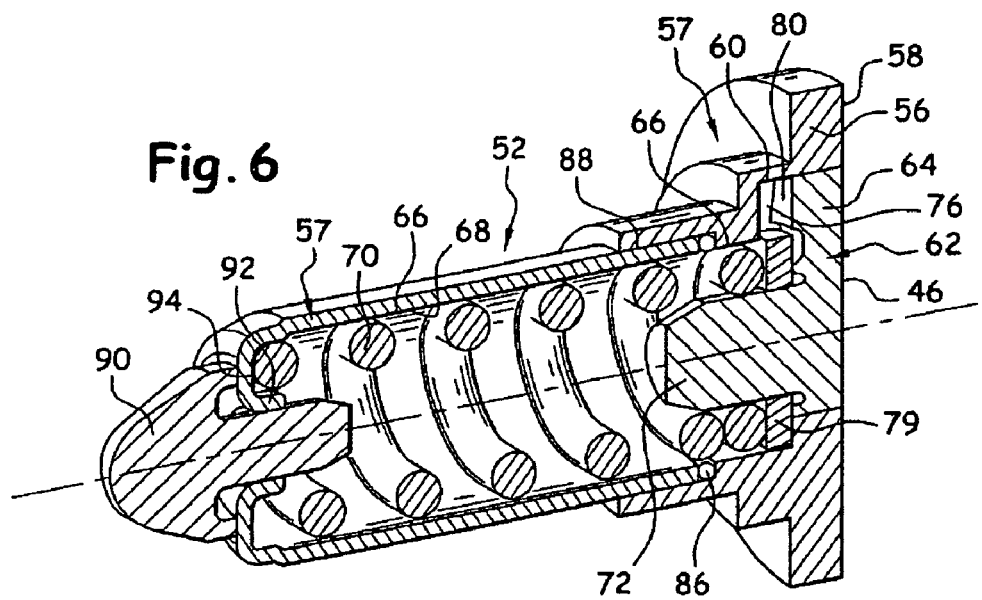
FIG. 6 is an assembled perspective view of a variant of the first embodiment of the push rod of the booster of FIGS. 3 to 5.

As an alternative, shown in FIG. 6, the front part could be tightly fitted in a front end bore 88 of the rear part 57. In that case, the preload of the spring 70 is defined by the depth of the fit, which can be limited by a key 86 housed at the bottom end of the bore 88.

Finally, it should be pointed out that the invention takes advantage of the tubular design of the front part. As illustrated in FIGS. 3 to 6 and 8, the tubular front part 67 accommodates, at its front end, an axial finger 90 which is, for example, crimped in a matching dish-shaped bearing surface 92 at the front end of the front part 67 and which is intended to allow the push rod 52 to press into a bore 91 of the primary piston 54. Advantageously, the dish-shaped bearing surface 92 defines, in the front part, a dish 94 allowing the spring 70 to bear.

What is claimed is:

1. A boosted brake (10) for a motor vehicle comprising a pneumatic brake booster (12) for actuating a master cylinder (14), said booster (12) comprises a rigid casing (16) inside which moves a transverse partition (18) sealably delimiting a front chamber (20) subjected to a first pressure ($P_1$) and a rear chamber (22) subjected to a second pressure ($P_2$) varying between the first pressure ($P_1$) and a pressure ($P_a$) greater than the first pressure ($P_1$), a moving piston (24) fixed to the moving partition (18) and comprising a front face (26) which acts on a primary piston (54) of the master cylinder (14) by way of a reaction disk (28) housed in a cage (30) interposed between the moving piston (24) and the primary piston (54), a control rod (32) which moves in the piston (24) selectively as a function of a first axial input force exerted forward against a return force exerted on the rod (32) by a return spring (34), a plunger (36) which is arranged in front of the control rod (32) in the piston (24) and a rear end (38) with at least one annular rear seat of a three-way valve (40) which progressively moves between a position in which, with the control rod (32) at rest, the front chamber (20) and the rear chamber (22) are in communication, and a position in which, with the control rod (32) actuated, the second pressure ($P_2$) prevailing in the rear chamber (22) increases, the valve (40) placing the rear chamber (22) in communication with the pressure ($P_a$) which is greater than the first pressure ($P_1$), and a feeler (42), arranged at the front end of the plunger (36) and passing through a bore (44) leading from the piston (24), which, when the control rod (32) is in the rest position, is arranged at a defined jump distance (d) from the reaction disk (28) and which, when the control rod (32) is actuated with an input force whose intensity is greater than a first defined intensity, comes into contact with the reaction disk (28) in such a way as to transmit to the plunger (36) and to the control rod (32) a reaction force of the master cylinder (14), the ratio of the area of the reaction disk (28) in contact with the cage (30) to the area of the feeler (42) in contact with the reaction disk (28) defining a first defined boost ratio, and said cage (30) comprises at least one moving decompression wall (46) which, when the control rod (32) is actuated with a second axial input force whose intensity is greater than a second defined intensity greater than said first axial input force, moves to create in the cage (30) an additional volume in which a front part (48) of the reaction disk (28) expands in order to reduce the reaction force transmitted to the feeler (42) by way of the rear face (50) of the reaction disk (28), the ratio of the area of the reaction disk (28) in contact with the cage (30) to the area of the feeler (42) in contact with the reaction disk (28) defining a second boost ratio, which is greater than the first boost ratio, characterized in that said control rod (32) comprises an independent push rod (52) which is interposed between the reaction disk (28) and the primary piston (54) of the master cylinder, and which comprises:

a rear section (56) having a rear face (58) arranged in contact with the reaction disk (28) and in which an opening (60) leading into the rear face (58) accommodates a matching decompression piston (62), of a defined transverse size (E), which comprises at least two radial branches (64) and a rear face of which forms the moving decompression wall (46), a tubular front section (66) of the outside diameter of the primary piston (54) of the master cylinder (14), of which a bore (68), which leads out at the front end of the opening (60) and has a diameter (D) smaller than the defined transverse size (E), accommodates a helical spring (70) accommodating a return rod (72) of the decompression piston (62), in order to provide a decompression piston (62) of maximum transverse size (E) and a push rod (52) of minimum diameter.

2. The boosted brake (10) according to claim 1, characterized in that, at the junction of the front section (66) and of the rear section (56):

the rear section (56) comprises at least one face (74) which forms an axial stop for the return spring (70) of the decompression piston (62), which face is arranged angularly between two successive branches (64) of the decompression piston (62) and which projects transversely inside the bore (68); and the front section (66) comprises at least one face (76) which forms an axial stop for the decompression piston (62), which face is arranged in the axial continuation of at least one of the two branches (64) of the decompression piston (62) and which projects inside the opening (60).

3. A boosted brake (10) according to claim 2, characterized in that a front end of each branch (64) of the decompression piston (62) comprises at least one bearing face (78) for the helical spring (70), which bearing face is arranged according to the diameter (D) of the tubular front section (66).

4. A boosted brake (10) according to claim 3, characterized in that the front end of each branch (64) of the decompression piston comprises at least one axial stop face (80) that interacts with the axial stop face (76) of the front section (66).

5. A boosted brake (10) according to claim 4, characterized in that the return rod (72) of the decompression piston (62) has a diameter corresponding substantially to the inside diameter of the helical spring (70).

6. A boosted brake (10) according to claim 5, characterized in that the push rod (52) comprises a bearing washer (79) which is fitted between the helical spring (70) and the bearing face (78) of the decompression piston (62) and has an outside diameter corresponding to that of the bore (68) of the front section (66) and has an inside diameter corresponding to that of the return rod (72) of the decompression piston (62).

7. A boosted brake (10) according to claim 6, characterized in that the push rod (52) comprises:

a tubular front part (67) which comprises one part of the front section (66); and a rear part (57) which internally comprises the other part of the front section (66) and the rear section (56).

8. A boosted brake (10) according to claim 7, characterized in that the front part (67) is tightly fitted in a front-end bore (88) of the rear part (57).

9. A boosted brake (10) according to claim 7, characterized in that the front part (67) is crimped onto a cylindrical front-end bearing surface (82) of the rear part (57) in a variable axial position allowing the preload of the helical spring (70) to be adjusted.

10. A boosted brake (10) according to claim 9, characterized in that the tubular front part (67) comprises, at its front end, an axial finger (90) intended to allow the push rod (52) to press on the primary piston (54) of the master cylinder (14).

11. A boosted brake (10) according to claim 10, characterized in that the decompression piston (62) comprises three branches (64) distributed angularly in a regular manner.

12. A boosted brake (10) according to claim 10, characterized in that the decompression piston (62) comprises two opposed branches (64) which extend radially as far as the periphery of the rear face (58) of the rear section (56).

* * * * *